(12) United States Patent
Dou et al.

(10) Patent No.: US 11,416,085 B2
(45) Date of Patent: Aug. 16, 2022

(54) MOUSE DEVICE

(71) Applicant: Silitek Electronics (Dongguan) Co., Ltd, Guang Dong Province (CN)

(72) Inventors: Gang Dou, Guangdong Province (CN); WeiWu Su, Guangdong Province (CN)

(73) Assignee: Silitek Electronics (Dongguan) Co., Ltd., Guang Dong Province (CN)

( * ) Notice: Subject to any disclaimer, the term of this patent is extended or adjusted under 35 U.S.C. 154(b) by 0 days.

(21) Appl. No.: 17/094,113

(22) Filed: Nov. 10, 2020

(65) Prior Publication Data

US 2022/0011884 A1 Jan. 13, 2022

(30) Foreign Application Priority Data

Jul. 13, 2020 (CN) .......................... 202010670013.5

(51) Int. Cl.
*G06F 3/0354* (2013.01)
*G06F 3/03* (2006.01)
*G06F 3/0362* (2013.01)

(52) U.S. Cl.
CPC ........ *G06F 3/03543* (2013.01); *G06F 3/0312* (2013.01); *G06F 3/0362* (2013.01); *G06F 2203/033* (2013.01)

(58) Field of Classification Search
CPC ... G06F 3/0312; G06F 3/0362; G06F 3/03543
See application file for complete search history.

(56) References Cited

U.S. PATENT DOCUMENTS

| | | | | |
|---|---|---|---|---|
| 2003/0194908 A1* | 10/2003 | Brown | .................... | H01R 31/06 439/620.22 |
| 2004/0239629 A1* | 12/2004 | Koo | ....................... | G06F 3/0312 345/163 |
| 2009/0122012 A1* | 5/2009 | Bohn | .................. | G06F 3/03543 345/163 |
| 2011/0227828 A1* | 9/2011 | Blandin | .............. | G06F 3/03543 345/163 |

\* cited by examiner

*Primary Examiner* — Hang Lin
(74) *Attorney, Agent, or Firm* — Umberg Zipser LLP; Ryan Dean

(57) ABSTRACT

A mouse device comprising a base, a first circuit board, a scroll wheel bearing, a light-emitting component and a scroll wheel. The first circuit board is disposed on the base. The scroll wheel bearing is mounted to the base. The light-emitting component is disposed on the scroll wheel bearing, and is electrically connected to the first circuit board. The scroll wheel is rotatably connected to the base and the scroll wheel bearing. The light-emitting component is disposed between the scroll wheel and the scroll wheel bearing. By disposing the light-emitting component in the scroll wheel, the light emitted from the light-emitting component would pass through the scroll wheel and the scroll wheel bearing to the outside, which can be evenly emitted from each side of the scroll wheel and the scroll wheel bearing for even light distribution and scrolling without obstruction.

13 Claims, 5 Drawing Sheets

MOUSE DEVICE

CROSS-REFERENCE TO RELATED APPLICATION

This application claims the priority benefit of Chinese Patent Application Serial Number 202010670013.5, filed on Jul. 13, 2020, the full invention of which is incorporated herein by reference.

BACKGROUND

Technical Field

The present invention relates to the technical field of mouse devices, particularly to a mouse device having a light-emitting component disposed in the scroll wheel.

Related Art

As a commonly used computer input device, a conventional mouse device comes with left and right buttons and a scroll wheel disposed between the left and right buttons. Operating the left and right buttons and the scroll wheel enables inputting different operating instructions to the computer. The scroll wheel is particularly crucial for the operation of video games on computers. Conventional mouse devices dedicated to video games are equipped with a light-emitting component on one side of the scroll wheel, having that the light passes through the gap between the scroll wheel and the left/right buttons when irradiating the scroll wheel which would glow as a result. However, as the conventional light-emitting component is disposed on the outside of one side of the scroll wheel, the light in the direction from the light-emitting component is brighter than the light in other directions. For example, the light seen on the side where the light-emitting component is disposed on the scroll wheel would be brighter than that on the side without the light-emitting component, resulting in uneven light distribution.

SUMMARY

The embodiments of the present invention provide a mouse device to solve the problem of uneven light distribution of a conventional mouse device.

The present invention provides a mouse device comprising a base, a first circuit board, a scroll wheel bearing, a light-emitting component, and a scroll wheel. The first circuit board is disposed on the base. The scroll wheel bearing is mounted to the base. The light-emitting component is disposed on the scroll wheel bearing and is electrically connected to the first circuit board. The scroll wheel is rotatably connected to the base and the scroll wheel bearing. The light-emitting component is disposed between the scroll wheel and the scroll wheel bearing.

In the embodiments of the present invention, by disposing the light-emitting component in the scroll wheel, the light emitted from the light-emitting component would pass through the scroll wheel and the scroll wheel bearing to the outside, which can be evenly emitted from each side of the scroll wheel and the scroll wheel bearing for even light distribution. Meanwhile, the scroll wheel could scroll smoothly without obstruction.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
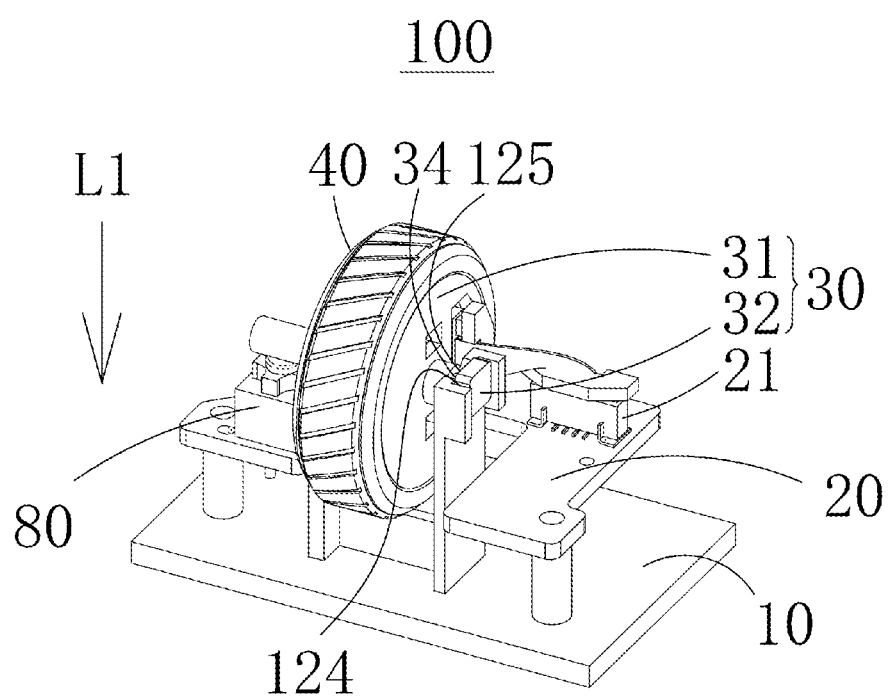
FIG. 1 is a perspective view of a mouse device of an embodiment of the present invention.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of earning out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

Figure 2:
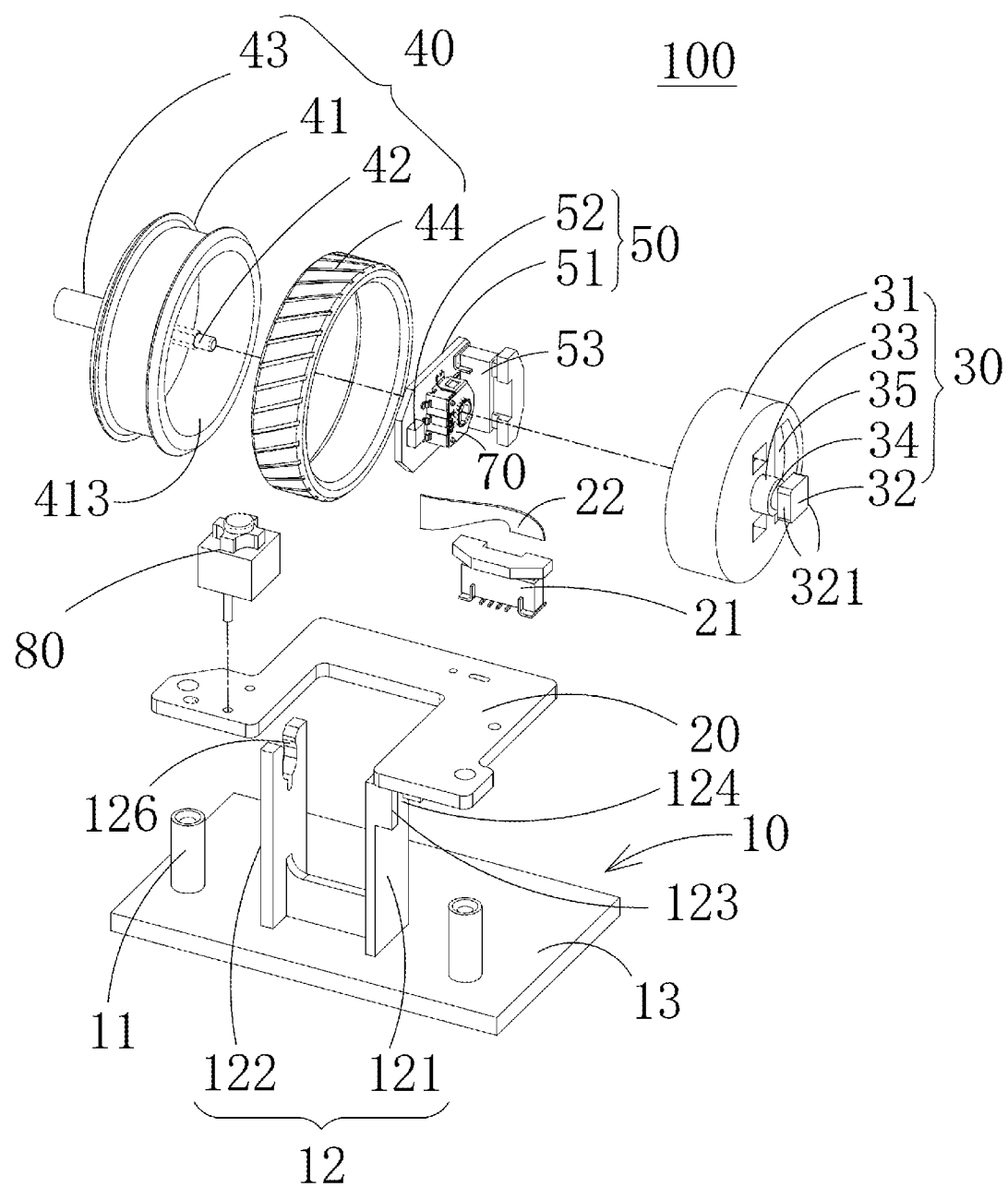
FIG. 2 is an exploded view of the mouse device of FIG. 1.
Figure 3:
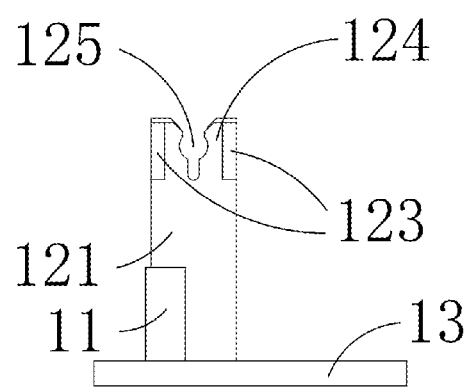
FIG. 3 is a side view of a base of the mouse device of FIG. 1.
Figure 4:
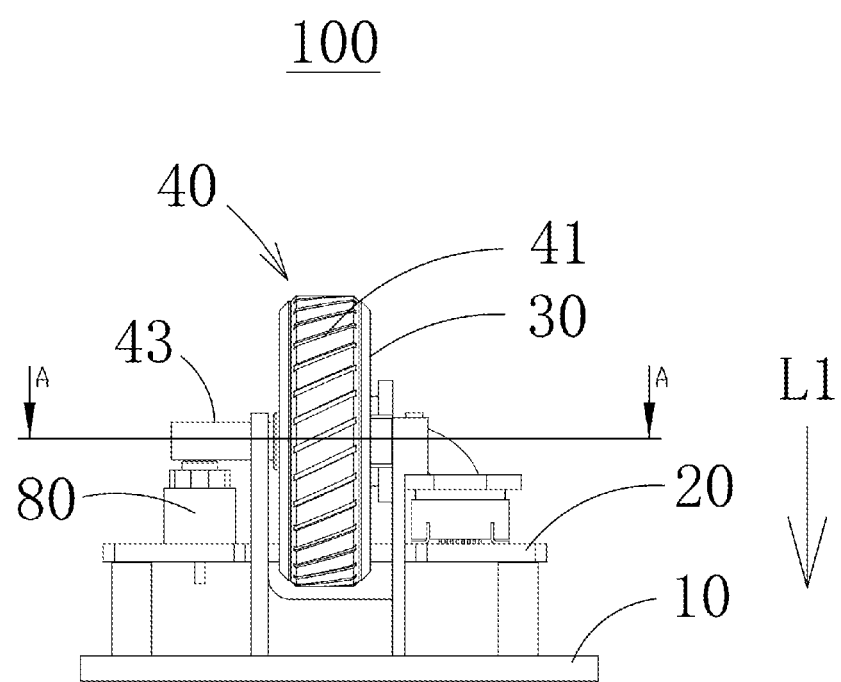
FIG. 4 is a front view of the mouse device of FIG. 1.
Figure 5:
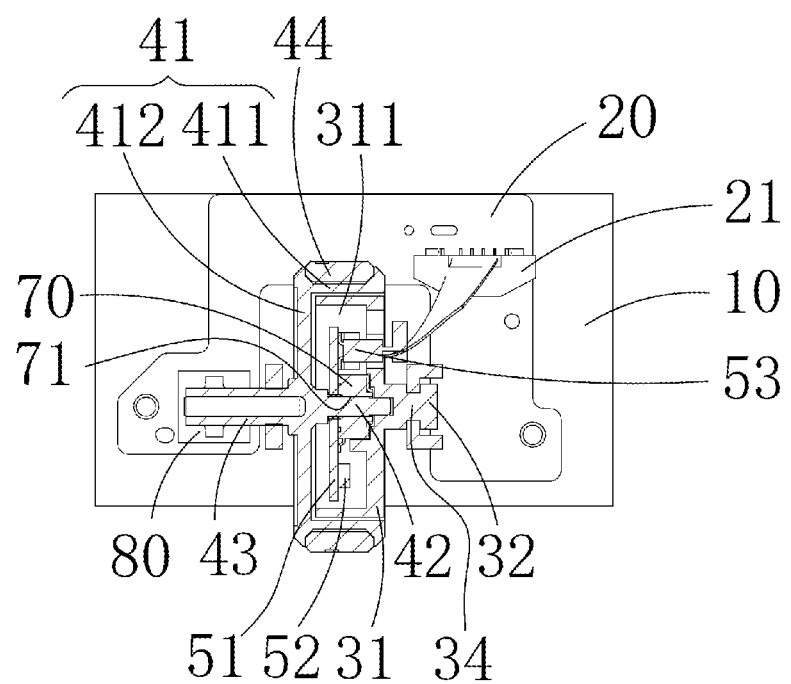
FIG. 5 is a cross-sectional view of the mouse device of FIG. 4 along line A-A.

FIG. 1 is a perspective view of a mouse device of an embodiment of the present invention. FIG. 2 is an exploded view of the mouse device of FIG. 1. FIG. 3 is a side view of a base of the mouse device of FIG. 1. FIG. 4 is a front view of the mouse device of FIG. 1. FIG. 5 is a cross-sectional view of the mouse device of FIG. 4 along line A-A. As shown in the figure, this embodiment provides a mouse device 100 including a base 10, a first circuit board 20, a scroll wheel bearing 30, a scroll wheel 40, and a light-emitting component 50.

As shown in FIG. 2 and FIG. 3, the base 10 comprises a pair of first supports 11, a second support 12, and a base plate 13. The first support 11 and the second support 12 are disposed upright on the base plate 13. The second support 12 is disposed between the pair of first supports 11. Each of the first supports 11 is cylindrical. The second support 12 comprises a first pillar 121 and a second pillar 122. The top end of the first pillar 121 comprises two ribs 123 oppositely disposed, between which a chute 124 is formed. A first notch 125 is provided at the bottom of the chute 124, and a second notch 126 is provided at the top of the second pillar 122. The second notch 126 corresponds to the first notch 125. The second support 12 is taller than the first support 11.

The board surface of the first circuit board 20 is U-shaped, and the two arms of the first circuit board 20 are respectively secured on the first support 11 with bolts. The surface of the first circuit board 20 is parallel to the base plate 13 of the base 10. When the first circuit board 20 is secured on the first support 11, the U-shaped first circuit board 20 surrounds the second support 12. A first electrical connector 21 and a switch 80 are disposed on the first circuit board 20. In this embodiment, the first electrical connector 21 and the switch 80 are respectively disposed on the two arms of the U-shaped first circuit board 20.

As shown in FIG. 1, FIG. 2 and FIG. 5, the scroll wheel bearing 30 is mounted to the base 10. The scroll wheel bearing 30 comprises a bearing body 31 and a protrusion 32. The protrusion 32 is connected to the bearing body 31 and disposed in the chute 124 of the first pillar 121 of the second support 12. As described above, as the second support 12 is taller than the first support 11, the scroll wheel bearing 30 is disposed above the first circuit board 20. In this embodiment, the protrusion 32 comprises two opposite sides 321. Since the two opposite sides 321 abut against the two opposite walls of the chute 124 respectively, the scroll wheel bearing 30 is restricted by the chute 124 and cannot rotate through the abutment between the protrusion 32 and the chute 124. In this embodiment, the protrusion 32 is rectangular-shaped. Besides, in this embodiment, the bearing body 31 is hollow-cylindrical-shaped, and the protrusion 32 is disposed at the center point of the axial end surface of the bearing body 31. Besides, the protrusion 32 is connected to the bearing body 31 through a shaft body 33. The shaft body comprises a neck part 34 slidably connected to the first notch 125. Thus, the scroll wheel bearing 30 could slide in a first direction L1. The first direction L1 is orthogonal to the surface of the first circuit board 20.

As shown in FIG. 2 and FIG. 5, the scroll wheel 40 is rotatably connected to the bearing body 31. The scroll wheel 40 comprises a scroll wheel body 41, a first shaft body 42, and a second shaft body 43. The first shaft body 42 and the second shaft body 43 are disposed on two opposite sides of the scroll wheel body 41. The scroll wheel body 41 is hollow-cylindrical-shaped and comprises a peripheral outer wall 411 and an axial end wall 412. The first shaft body 42 and the second shaft body 43 are disposed on two opposite surfaces of the axial end wall 412 and extend in opposite directions. The inner diameter of the scroll wheel body 41 is greater than the outer diameter of the bearing body 31, so the scroll wheel body 41 is rotatably mounted to the bearing body 31. The scroll wheel 40 further comprises an operating member 44 sleeved on the peripheral outer wall 411 of the scroll wheel body. The operating member 44 is made of rubber on which a tread is presented for users to turn the scroll wheel 40 around the bearing body 31 with fingers. The second shaft body 43 is slidingly assembled to the second notch 126 of the second pillar 122 of the second support 12 of the base 10. The first shaft body 42 can be inserted into the bearing body 31 and can be rotatably assembled to the bearing body 31. By inserting the first shaft body 42 of the scroll wheel 40 into the bearing body 31, the scroll wheel 40 can be rotatably supported by the scroll wheel bearing 30.

As shown in FIG. 2 and FIG. 5, the light-emitting component 50 comprises a second circuit board 51 and a light-emitting element 52. The second circuit board 51 is disposed on the scroll wheel bearing 30 and is electrically connected to the first circuit board 20. The light-emitting element 52 is disposed on and electrically connected to the second circuit board 51. As described above, the bearing body 31 and the scroll wheel body 41 are both hollow-cylindrical-shaped. The scroll wheel body 41 comprises an opening 413, which is disposed opposite to the axial end wall 412. The bearing body 31 is disposed in the scroll wheel body 41 through the opening 413. The bearing body 31 comprises a recess 311 facing the scroll wheel body 41, and the light-emitting component 50 is disposed in a recess 311. Thus, when the bearing body 31 is assembled to the scroll wheel body 41, an accommodating space can be formed between the bearing body 31 and the scroll wheel body 41 in addition to the forming of a combination in which the scroll wheel body 41 rotates around the bearing body 31. That is, an accommodating space is defined between the recess 311 and the axial end wall 412. The second circuit board 51 is disposed in the accommodating space and secured to the bearing body 31, and the second circuit board 51 and the protrusion 32 are disposed on two opposite sides of the bearing body 31. The second circuit board 51 comprises a second electrical connector 53 electrically connected to the first electrical connector 21 of the first circuit board 20 through a cable 22, which can be a flexible flat cable or a flexible circuit board, for example. The cable 22 is connected to the first electrical connector 21 and the second electrical connector 53 which are respectively disposed on the outside and inside of the bearing body 31 through the opening 35 of the bearing body 31. In one embodiment, the second electrical connector 53 is disposed on a surface of the second circuit board 51 away from the scroll wheel 40, and the light-emitting element 52 and the second electrical connector 53 could be respectively disposed on the same or different surfaces. The light-emitting element 52 can be disposed on a surface of the second circuit board 51 away from the scroll wheel 40, or the light-emitting element 52 can be disposed on a surface of the second circuit board 51 close to the scroll wheel 40, or meanwhile, the light-emitting element 52 can be disposed on the surface of the second circuit board 51 away from the scroll wheel 40 and the surface of the second circuit board 51 close to the scroll wheel 40. In this embodiment, the light-emitting element 52 could be a light-emitting diode. The number of light-emitting element 52 can be one or more than one. When the light-emitting component 50 comprises a plurality of light-emitting elements 52, the light-emitting elements 52 can be respectively disposed on two opposite surfaces of the second circuit board 51.

The scroll wheel bearing 30 and the scroll wheel 40 are transparent (for example, transparent plastic) to allow the light emitted from the light-emitting element 52 to pass through the scroll wheel bearing 30 and the scroll wheel 40. The light emitted by the light-emitting element 52 is diffused and reflected by the scroll wheel bearing 30 and the scroll wheel 40, then light could be emitted from the scroll wheel bearing 30 and the scroll wheel 40. The brightness of the light-emitting element 52 can be altered according to the design of the programming.

As shown in FIG. 2 and FIG. 5, the mouse device 100 of the present invention further comprises an encoder 70 disposed on and electrically connected to the second circuit board 51 for sensing the rotation of the scroll wheel 40 to generate a first signal. The encoder 70 comprises a shaft hole 71. After the first shaft body 42 passes through the second circuit board 51, it passes through the shaft hole 71 of the encoder 70 and is inserted into the bearing body 31, and the first shaft body 42 is rotatably assembled to the bearing body 31. In this way, when the scroll wheel 40 rotates, the encoder 70 could sense the rotation of the first shaft body 42 to generate a first signal. The first signal is transmitted to the first circuit board 20 through the second circuit board 51 and then is transmitted to a computer device in a wired or wireless transmission manner to perform a function of page scrolling or image zooming. In this embodiment, the encoder 70 is disposed on the surface of the second circuit board 51 away from the scroll wheel 40.

As shown in FIG. 1, FIG. 4 and FIG. 5, the mouse device 100 of the present invention further comprises a switch 80, which is disposed on and electrically connected to the first circuit board 20 and is disposed corresponding to the second shaft body 43 of the scroll wheel 40. When the scroll wheel member 40 is pressed to move downward in the first direction L1, the second shaft body 43 would move in the first direction L1 to push the switch 80 to trigger the switch 80, thereby generating a second signal. Similarly, the second signal is transmitted from the first circuit board 20 to the computer device, performing an effect of scrolling the page up, down, left, and right, for example.

In another embodiment, the scroll wheel bearing 30 could also be securely disposed on the second support 12 of the base 10. Since a significant gap exists between the scroll wheel body 41 and the bearing body 31, the scroll wheel body 41 could move relative to the bearing body 31 through the gap when the scroll wheel 40 is pressed, allowing the scroll wheel 40 to move downward in the first direction L1 and the second shaft body 43 pushes the switch 80 to trigger the switch 80.

In summary, the present invention proposed a mouse device. By disposing the light-emitting component in the scroll wheel, the light emitted from the light-emitting component would pass through the scroll wheel and the scroll wheel bearing to the outside, which can be evenly emitted from each side of the scroll wheel and the scroll wheel bearing for even light distribution. Meanwhile, the scroll wheel could scroll smoothly without obstruction. Besides, by disposing the encoder inside the scroll wheel, the rotation of the scroll wheel could be facilitated and the space within the scroll wheel can be effectively used to minimize the size of the device.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A mouse device, comprising:
    a base;
    a first circuit board disposed on the base;
    a scroll wheel bearing, wherein the scroll wheel bearing comprises a bearing body and a protrusion connected to the bearing body, and the scroll wheel bearing is mounted to the base through the protrusion;
    a scroll wheel mounted to the base and rotatably connected to the scroll wheel bearing, wherein the scroll wheel comprises a scroll wheel body, the scroll wheel body comprises an opening, the bearing body is disposed in the scroll wheel through the opening such that an accommodating space is entirely enclosed by the scroll wheel and the bearing body of the scroll wheel bearing; and
    a light-emitting component disposed in the accommodating space, and the light-emitting component being electrically connected to the first circuit board.

2. The mouse device according to claim 1, wherein the light-emitting component comprises a second circuit board and a light-emitting element; the second circuit board is disposed on the scroll wheel bearing; and the second circuit board is electrically connected to the first circuit board; the light-emitting element is disposed on and electrically connected to the second circuit board.

3. The mouse device according to claim 2, wherein the first circuit board comprises a first electrical connector; the second circuit board comprises a second electrical connector; the second electrical connector is electrically connected to the first electrical connector; the light-emitting element and the second electrical connector are respectively disposed on the same or different surfaces of the second circuit board.

4. The mouse device according to claim 2, wherein the number of light-emitting element is plural; the plurality of light-emitting elements are respectively disposed on a surface of the second circuit board away from the scroll wheel and a surface of the second circuit board close to the scroll wheel.

5. The mouse device according to claim 2, wherein the scroll wheel comprises a first shaft body and a second shaft body; the first shaft body and the second shaft body are disposed on two sides of the scroll wheel body; the first shaft body passes through the second circuit board; and the first shaft body is rotatably connected to the scroll wheel bearing; the second shaft body is rotatably connected to the base.

6. The mouse device according to claim 5 further comprises an encoder disposed on the second circuit board; and the encoder senses the rotation of the scroll wheel to generate a first signal; the first shaft body penetrates in a shaft hole of the encoder.

7. The mouse device according to claim 5 further comprises a switch disposed on the first circuit board; and the switch corresponds to the second shaft of the scroll wheel; when the scroll wheel moves in a first direction, the second shaft body triggers the switch to generate a second signal; the first direction is orthogonal to the first circuit board.

8. The mouse device according to claim 1, wherein the base comprises a chute; the scroll wheel bearing is mounted to the chute; and the scroll wheel bearing is moving in a first direction under the restriction of the chute; the first direction is orthogonal to the first circuit board.

9. The mouse device according to claim 8, wherein the protrusion of the scroll wheel bearing is disposed in the chute; the scroll wheel is rotatably connected to the bearing body of the scroll wheel bearing.

10. The mouse device according to claim 2, wherein the inner diameter of the scroll wheel body is greater than the outer diameter of the bearing body; the second circuit board is secured to the bearing body; and the second circuit board is opposite to the protrusion.

11. The mouse device according to claim 10, wherein the bearing body comprises a recess facing the scroll wheel body; the second circuit board is disposed in the recess.

12. The mouse device according to claim 10, wherein the scroll wheel further comprises an operating member sleeved on a peripheral outer wall of the scroll wheel body; the operating member is made of rubber on which a tread is presented.

13. The mouse device according to claim 1, wherein at least one of the scroll wheel bearing and the scroll wheel is transparent.

\* \* \* \* \*